F. H. HILL.

COFFINS.

No. 7,649. Reissued May 1, 1877.

Attest
U. W. Clay Jr.
E. S. Lloyd

INVENTOR
FRANCIS H. HILL
Per. Coburn & Thacher
Att'ys

N. PETERS, PHOTO-LITHOGRAPHER, WASHINGTON, D. C.

UNITED STATES PATENT OFFICE.

FRANCIS H. HILL, OF CHICAGO, ILLINOIS.

IMPROVEMENT IN COFFINS.

Specification forming part of Letters Patent No. 83,964, dated November 10, 1868; reissue No. 7,649, dated May 1, 1877; application filed January 5, 1877.

*To all whom it may concern:*

Be it known that I, FRANCIS H. HILL, of Chicago, in the county of Cook and State of Illinois, have invented a new and useful Improvement in Coffins, which is fully set forth in the following specification, reference being had to the accompanying drawings, in which—

Figure 1:
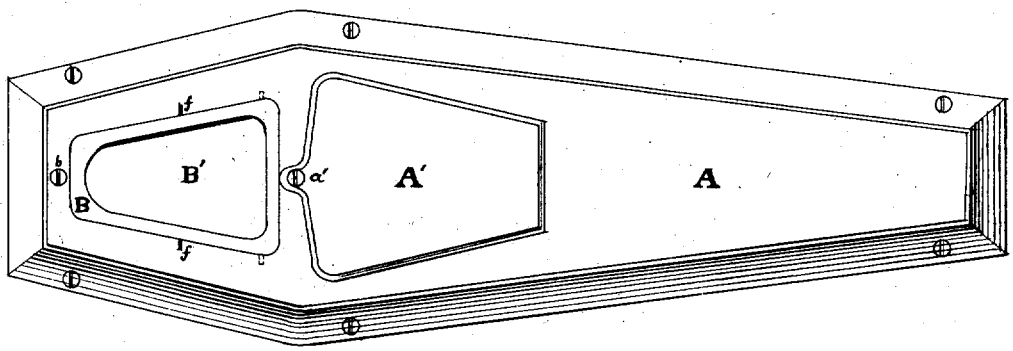
Figure 2:
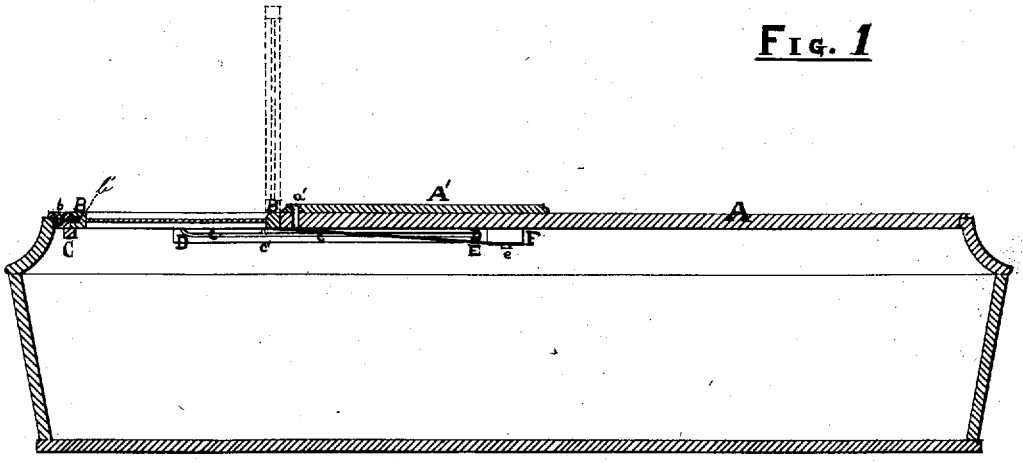
Figure 3:
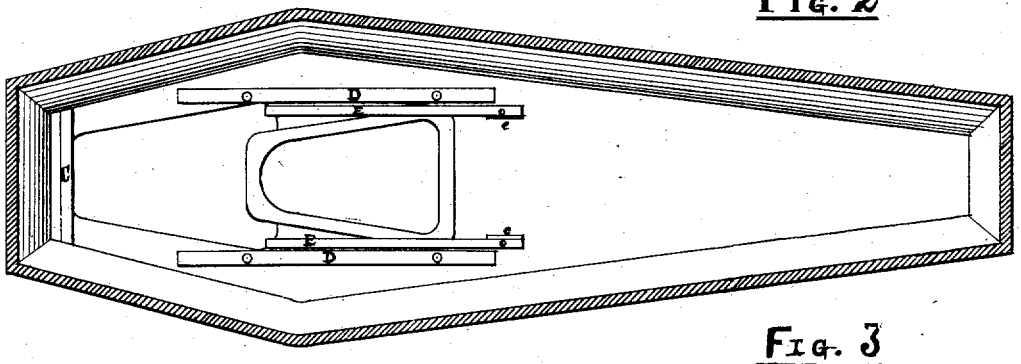
Figure 4:
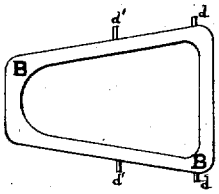

Figure 1 represents a plan or top view of my invention. Fig. 2 is a central longitudinal vertical section thereof. Fig. 3 is a bottom view of the lid with its attachments, and Fig. 4 is a detached view of the frame containing the glass.

My invention relates to the mode of connecting the face-glass of coffins to the lid; and its object is to obtain such a construction of the lid and face-glass as will permit the coffin to be opened at the head to give access to the face of the corpse without removing the glass from the opening in which it is set.

The invention consists in combining with the lid, constructed as shown, an independent movable face-glass, which, while supported by the lid, may be slid back to open the coffin at the head.

It also consists in setting the face-glass in a frame which is hinged to the lid, so that the glass may be turned up or slid back to open the coffin, as may be desired.

In the drawings, A represents the top or lid of the coffin, having an opening of suitable shape therein, near the head, into which a movable frame, B, is closely fitted, containing a glass, B′, as shown. The said frame B is provided upon each side, at the lower end, with short pins or lugs, (marked *d d*,) and near the middle of each side with two similar lugs or pins, (marked *d′ d′*,) as shown in Fig. 4 of the drawings. In the sides of the opening in the lid A, which receives the frame B, are slots *f f*, as shown in Fig. 1, to receive said lugs *d′ d′*, which slots or grooves curve, as shown in Fig. 2, and connect with the grooves *c* parallel with the lid, and beneath the same, said grooves being cut or formed in the inner faces of the bars D D, secured to the under side of the lid, as shown in Fig. 2 of the drawings. E E represent two springs, secured at one end properly to the lid, or to blocks F attached thereto. The other ends of said springs lie beneath the frame B, and support the same, as shown, and as hereinafter described. C C represent a bar, arranged beneath the lid, at the head, upon which the end of the frame B is supported when adjusted in the aperture in the lid, so as to close the coffin, as shown in Fig. 2 of the drawings. A screw or pin, *b*, is provided with a horizontal lip, *b′*, which can be turned into a recess in the end of the frame B, to lock it firmly in place, but can be turned back to unlock the said frame when it is desired to open the same upward. In the side bars D D, containing the aforesaid grooves *c c* at the heel of the frame B, there are vertical slots *c′ c′*, opening up from said grooves *c c*, as shown in Fig. 2. The rear lugs *d d* lie in said vertical grooves *c′ c′*, and the central lugs *d′ d′* in the vertical grooves *f f*, when the frame B is adjusted in place, as shown in Figs. 1 and 2, the springs E holding said frame up in position.

When it is desired to open the aperture in the coffin-lid the rear end of the frame is depressed until the lugs *d d* move down into the grooves *c c*, when said frame may be moved back beneath the lid, the lugs *d d* sliding in the grooves *c c*, and the lugs *d′ d′* passing down the curve of *f f* into the said grooves *c c*, as clearly shown in Fig. 2, the springs E E yielding to permit such adjustment.

When the aperture is closed, the frame B is moved forward until the lugs *d* and *d′* come to the grooves *c′* and *f*, when the springs E E throw the frame up into place, and the lock *b b′* is turned to secure the same, as desired.

The said removable frame, if desired, can be unlocked and opened upward, as indicated by the dotted lines in Fig. 2, turning upon the lugs *d d* as upon the hinge. When this mode of opening the frame is employed any other species of hinge may be used, and the provisions for permitting the sliding of the frame may be omitted, and also the springs E E may be dispensed with. In such case the lugs *d′ d′* upon the frame B are of no practical necessity; or the construction and arrangement of the frame and its attachments may be such that the frame may be moved back beneath the lid, and opened upward, as described and shown; or it may have such construction as will enable the frame to slide back under the lid only, and have no movement upward upon a hinge.

A′ represents a movable cover, pivoted to the lid at *a′*, so that it may be turned or moved around from the position indicated in the drawings over the glass and its frame, to cover and protect the same.

When the frame B is removed from the opening by sliding the same back beneath the lid, or when it is moved forward to close said opening, the lock *b′* need not be disturbed or moved, this being necessary only when the frame B is opened upward.

Having thus described my invention, what I claim as new, and desire to secure by Letters Patent, is—

1. In a coffin or casket, the lid A, constructed so as to lie in substantially the same horizontal plane, in combination with an independent face-glass, loosely fitted in the lid, so as to slide back to open the coffin, and a supplementary cover, A′, arranged immediately above the lid, and adapted to be moved over the face-glass and permanently close the casket, substantially as described.

2. The coffin-lid A, in combination with a movable face-glass, supported in the opening in the lid, the two parts being constructed and arranged so that the glass may be depressed and moved back beneath the lid, substantially as described.

3. The coffin-lid A, in combination with a face-glass hinged to the lid, whereby the face-glass may be swung up and down to open and close the coffin, substantially as described.

4. The coffin-lid A, in combination with a hinged reciprocating face-glass, which may be either slid back or swung upward on its hinges to open the coffin, substantially as described.

FRANCIS H. HILL.

Witnesses:
L. A. BUNTING,
L. M. HARRIS.